3,165,509
AZIRIDINYL-PROPANOL COMPOUNDS, METHOD
OF MAKING SAME, AND POLYMERS THEREOF
Herbert W. Mackinney, Endwell, N.Y., assignor to
Chemirad Corporation, Milltown, N.J.
No Drawing. Filed Jan. 6, 1960, Ser. No. 683
13 Claims. (Cl. 260—239)

This invention relates to aziridinyl propanol compounds, to methods of making such compounds, to methods of utilizing such derivatives, and to compositions and articles containing such compounds.

Aziridinyl compounds heretofore produced in the art as by reaction of ethylene imine with isocyanates, were of unsaturated constitution and often referred to as "ethylene ureas." The more popular one of this aliphatic-type compound had eighteen carbon atoms, but was derived from a mono-isocyanate, therefore yielding only a mono-functional aziridinyl compound. Bi-functional derivatives were developed through the use of aromatic di-isocyanates. In order to utilize bi-functional aliphatic aziridinyl compounds, hexamethylene di-isocyanate was reacted with ethylene imine producing the corresponding bi-functional aziridinyl derivative having a chain of six carbons. The hexamethylene di-isocyanate is not available however at this time because American manufacturers of isocyanates have given up the production of short chain aliphatic di-isocyanates in view of their extremely poisonous character. Furthermore all addition products of ethyleneimine to isocyanates contain the grouping $$-N-C=O$$
$$\underset{|}{N}$$
$$-C-\!\!-\!\!-C-$$

from which the aziridinyl ring is readily removed by hydrolysis.

Among the objects of the present invention are the production and utilization of monomeric bi-functional saturated aziridinyl compounds of reduced toxicity and enhanced resistance to hydrolysis.

Further objects include polymeric products of such aziridinyl compounds.

Still further objects include methods of producing both the monomeric and polymeric compounds, compositions containing such compounds, and methods of producing and utilizing them.

Other and further objects will appear from the more detailed description given below by way of illustration and explanation and not limitation, since various changes therein may be made by those skilled in the art without departing from the scope and spirit of the present invention.

In accordance with this invention, compounds are produced and utilized which may be described as aliphatic hydrocarbon chains characterized by the presence of an ethylene imine or substituted ethylene imine ring at each end of the carbon chain and of a hydroxyl group on the chain.

More particularly they are saturated monomeric compounds containing two or more groupings $$\begin{array}{c} CR_2 \\ \diagdown \\ \diagup N-CH-C- \\ CR_2 \quad \quad \overset{|}{\underset{H}{O}} \end{array}$$

resulting from the reaction of an ethylene imine and its alkyl, aryl, aralkyl etc. derivatives in the presence of hydroxides of alkali or alkaline earth metals with compounds containing one or more groupings $$C-\!\!-\!\!-C-C-C-Cl$$
$$\diagdown_{O}\diagup$$

Such compounds may be generally formulated as $$\begin{array}{c}
R^1 \diagdown \quad\quad\quad\quad\quad\quad\quad\quad\quad R^5 \diagdown \\
\phantom{R^1}C \quad\quad\quad R^{10}\; R^9\; R^{11} \quad\quad C \\
R^2 \diagup | \diagdown \quad |\quad|\quad| \diagup | \diagdown R^6 \\
\phantom{R^2}\quad N-C-C-C-N \\
R_3 \diagdown | \diagup \quad |\quad|\quad| \diagdown | \diagup R^7 \\
\phantom{R_3}C \quad\quad\quad H\; O\; H \quad\quad C \\
R^4 \diagup \quad\quad\quad\quad H \quad\quad\quad\quad \diagdown R^8
\end{array}$$

in which substituents $R^1$ to $R^9$ are selected from hydrogen, alkyl, cycloalkyl, aralkyl and aryl including, for example, methyl, ethyl and higher alkyl, cyclopropyl, benzyl, and phenyl, and in which the substituents $R^{10}$ and $R^{11}$ may be any of the groups enumerated above for $R^1$ to $R^9$ or may consist of repeated chains of three carbon atoms each to the terminal carbons of which there are attached aziridine rings and to the middle carbon of which there is attached a hydroxyl group. The aziridinyl group may thus be derived from an ethyleneimine reactant such as ethyleneimine, 2-ethyl ethyleneimine, 2-methyl ethyleneimine, 2-cyclopropyl ethyleneimine, 2-benzyl ethyleneimine, and 2-phenyl ethyleneimine, as well as disubstituted compounds such as 2,3 dialkyl, 2,2 or 2,3 diaryl ethyleneimines, etc. in which alkyl, aryl, etc. may be any of the groups referred to above and others, such as 2,2 dimethyl ethyleneimine, etc.

The other reactant is an epihalohydrin particularly epichlorohydrin or epibromohydrin, and epichlorohydrin will be used illustratively below. The hydrogen atoms of epichlorohydrin or epibromohydrin may also be replaced by substituent groups as set forth above for the imines. In this respect activity is better retained if the substituent is not attached to the terminal $CH_2$ group of the epoxy: thus (V)
$$\begin{array}{c} CH_3 \\ | \\ CH_2-\!\!-\!\!-C-CH_2-Cl \\ \diagdown_{O}\diagup \end{array}$$

is more reactive than the compound (VI)
$$\begin{array}{c} H \\ | \\ H_3C-C-\!\!-\!\!-CH-CH_2-Cl \\ \diagdown_{O}\diagup \end{array}$$

Taking 1,3-bis aziridinyl 2-propanol as exemplary, having the formula (VII) 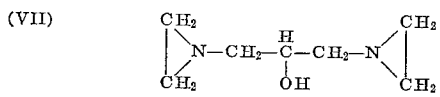

the reaction is believed to proceed in the following three steps conducted simultaneously:

STEP 1

(VIII) 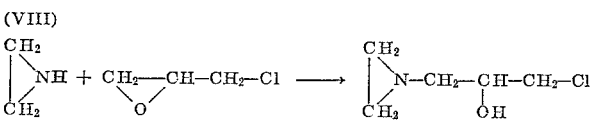

STEP 2

(IX) 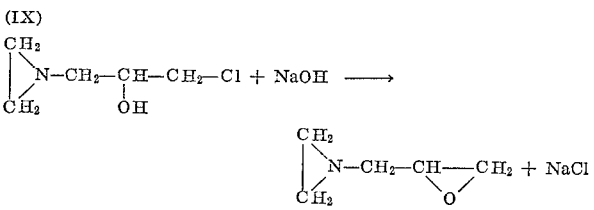

STEP 3

(X) 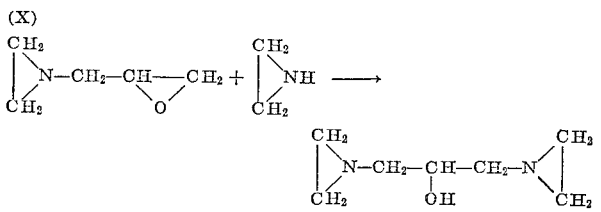

Steps 1 and 3 appear to proceed rapidly. Step 2 is slower and may be considered as the rate-controlling step. The rate of step 2 has been found to vary substantially depending on other factors such as temperature. It has been found to require about two to four hours at 25–30° C. (a temperature safe for 2-ethyl ethyleneimine, but not desirable for ethyleneimine itself) but between about 8 and 12 hours at the preferred temperature of 5 to 10° C.

With respect to ratios of ethyleneimine or its derivative to epichlorohydrin or to its derivative, preferred ratios are between 3:1 to 1.5:1. A minimum of two mols ethyleneimine per mole epichlorohydrin is desirably required for satisfactory yields and also NaOH in excess cannot substitute for ethyleneimine. In particular this distinguishes the conditions which favor the monomeric rather than polymeric products such as were made by reaction of ethyleneimine and epichlorohydrin in the absence of alkali by Nishihara and by Manecke and Bonhoefer. It has been shown (Benoit) that the hydrochlorides of EI etc. cannot be made if any water is present. The EI polymerizes immediately. Reaction of the expoxy ring of epichlorohydrin with alcohols is slow, and hence does not interfere with reaction of epichlorohydrin with ethyleneimine. Alcohols are solvents for the alkali and the byproduct salt, as well as for ethylenimine, epichlorohydrin and the aziridinyl propanol and so are preferred solvents for the invention. Methanol is preferred because available commercially in anyhdrous condition at low cost. Low boiling point under reduced pressure facilitates removal from the reaction product.

A compound which removes hydrochloric acid or its elements from the imine chlorohydrin in step 2 above is required. This requies a base whose chloride salt is not readily hydrolyzed and which reacts rapidly enough to trigger the closing of the ring after removal of Cl. Strong inorganic bases generally such as NaOH, KOH, Ca(OH)$_2$, that is hydroxides of the alkali or alkaline earth metals are generally required. Organic amines may also be used as HCl acceptors as long as their basic characteristics are approximately equivalent to those of the inorganic hydroxides mentioned.

The compounds produced herein are stable desirably when stored cold over solid caustic soda or quicklime (CaO). Loss appears not to exceed 10% in three months under these conditions.

As exemplary of the general procedure followed, and considering 1,3-bis aziridinyl 2-propanol, the method may be as follows: This compound may be prepared by reacting ethylene imine with epichlorohydrin desirably while cooling in the presence of a dehydrohalogenating agent such as caustic alkali. A liquid organic vehicle is preferably present such as methanol. The temperature is usually maintained below room temperature until reaction has proceeded substantially. Stirring for several hours or standing for from several days to a week or more may be required to produce substantial reaction product, depending on the operating conditions. Sodium chloride formed, may be filtered off and the filtrate treated to recover the desired product as by concentration in vacuo at a temperature desirably not above about 40 degrees C.

In the following examples, parts are by weight unless otherwise indicated.

*Example 1*

The following example of producing 1,3-bis-azirindinyl 2-propanol is exemplary. 26 grams (0.6 mol) ethylene imine were dissolved in 50 grams methanol, with cooling to 5–10 degrees C. 18 grams (0.2 mol) epichlorohydrin were carefully added, then with similar cooling a solution of 8 grams (0.2 mol) sodium hydroxide in 50 grams methanol. After two weeks at 5 degrees C. this was a colorless solution with a white precipitate, which was separated after addition of an equal volume of acetone to the solution. Weight of dried precipitate: 10 grams, identified by solubility in water and reaction with silver nitrate as sodium chloride.

This filtrate, which had an alkaline reaction, was concentrated under reduced pressure at liquid temperature not over 40 degrees C. until no more volatile material could be separated. The residue was a viscous yellow oil with some suspended salt from which the oil was decanted before analysis. The oil polymerized in air to a colorless solid, insoluble in water and methanol.

The preparation was repeated with 25 fold quantities except that isopropyl ether was substituted for acetone to precipitate the salt. Storage over sodium hydroxide removed some water. Yield approximately 1 pound.

The product was identified as 1,3 bis-aziridinyl 2-propanol having the formula given above.

Identification of the viscous oil product obtained in the above examples, was carried out by modern procedures and the following data is selected and condensed therefrom.

(1) Analysis for azirane rings by the method of Allen and Seaman. Analyt. Chem. 27: 540–3 (1955)

Azirane ring content as $C_2H_4N$: 46.7 percent. Calc. for $C_7H_{14}ON_2$: $C_2H_5N$ content 59.1 percent. Apparent assay as 1,3-bis-aziridinyl 2-propanol: 79 percent.

(2) Infra red spectrogram—Absorption bands observed:

(a) Broad, strong, symmetrical band at 3360 cm.$^{-1}$ characteristic of bonded hydroxyl in compounds of the type

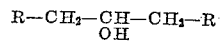

(b) Broad absorption at 1110 cm.$^{-1}$ consistent with symmetrical secondary hydroxyl with chain branched on alpha carbon (c) Band at 3040 cm.$^{-1}$ characteristic of C—H stretching in 3-membered ring (d) Ethylene imine ring deformation at 818 cm.$^{-1}$ well defined. Other absorptions at 1280, 1015, 850 cm.$^{-1}$ consistent with

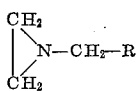

(e) Absorption at 2980 cm.$^{-1}$ agrees with findings on N-methyl ethylene imine.

(f) Bands due to C—H at 2970, 2720, 1460–65 cm. are not in this readily distinguished as due to —CH$_2$ or —CH$_3$. However, symmetrical C—H bonding at 1379 cm.$^{-1}$ (for CH$_3$) and C—CH rocking at 1132–1141 are absent and 1305 cm.$^{-1}$ methylene wagging is present though weak. Band at 2390 cm.$^{-1}$ gives some evidence of $$C-CH-C \atop | \atop O$$

also 1160 cm.$^{-1}$.

(g) The broad absorption at 1670 cm.$^{-1}$ is ascribed to possible water. Unsaturation also absorbs here but lacks confirmation at 940–1000 cm.$^{-1}$.

Absent absorptions:

(h) N—H at 1209 cm.$^{-1}$ (3341 cm.$^{-1}$ masked by O—H)

(i) Epoxy at 827, 1022, 1182 cm.$^{-1}$ (j) C—Cl at 650–700 cm.$^{-1}$.

*Example II.—2-Ethyl Ethyleneimine and Epichlorohydrin*

A solution of 92.5 grams (one mol) epichlorohydrin in 200 ml. methanol was slowly added at 25° C. to an agitated solution of 178 grams of 2-ethyl ethyleneimine (2.5 mols, formula

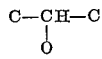

in 200 ml. methanol. Exotherm was slight.

To the mixture there was added a solution of 40 grams sodium hydroxide in 40 grams water, the addition being slow, with cooling to maintain the temperature at 25° C. Stirring was continued until no more salt separated (about 2 hours). To the solution there was now added an equal volume of acetone and stirring continued for 30 minutes to complete separation of salt. The solution was now filtered and concentrated under reduced pressure at a liquid boiling temperature not over 40° C., until all solvent was removed. The residual oil was now analyzed for azirane content. Assay: 102.0%.

*Example III.—2-Methyl Ethyleneimine and Epichlorohydrin*

To a solution of 40 grams sodium hydroxide in 500 ml. methanol was added 2-methyl ethyleneimine (3 mols, 171 grams) which was slowly added at 10° C. to 1 mol (92.5 grams) epichlorohydrin. Stirring was continued at 10° C. until no more salt separated, about 12 hours. To the solution was added an equal volume of isopropyl ether and the solution stirred about 30 minutes, after which no further salt separated. The clear filtrate was concentrated as in Example I.

*Example IV.—Ethyleneimine Plus Epichlorohydrin, Using Excess NaOH Instead of Excess Ethyleneimine*

To solution of 86 grams ethyleneimine and 80 grams sodium hydroxide (made by first dissolving the NaOH, then cooling) then the ethyleneimine in 1000 ml. methanol (preferably dry) at 5–10° C. were slowly added 92.5 grams (1 mol) epichlorohydrin, with agitation, which was continued until no more salt separated (approximately 8 hours). Then was added equal volume of isopropyl ether, agitation continued for further 30 minutes, solution filtered and concentrated as above. (Assay: 2 percent.)

The following examples illustrate effects of variations in the processes disclosed herein. Where an ether is used in the reaction, the procedure may follow that of Example III or Example IV above. Where acetone is employed, the procedure of Example II above may be utilized. EI means ethyleneimine. EpCH means epichlorohydrin. In the first column the temperature or range of temperatures is given at which the example was carried out.

*Example V*

[Ratio of EI to EpCH is 2.5:1]

| 10° C. | 160 g. NaOH pellets (4 moles)<br>1,000 ml. Methanol<br>450 g. EI (10 moles)<br>370 g. Epichlorohydrin (4 moles)<br>1,000 ml. Isopropyl Ether | Analysis:<br>63.3%<br>azirane<br>ring. |
|---|---|---|

*Example VI*

[Ratio of EI to EpCH is 2:1]

| −10° C. +10° C. | 1,000 ml. methanol<br>80 g. NaOH pellets (2 moles)<br>86 g. EI (2 moles)<br>92.5 g. Epichlorohydrin (1 mole)<br>1,000 ml. Acetone | Analysis:<br>56.4%<br>azirane<br>ring. |
|---|---|---|

*Example VII*

[Ratio of EI to EpCH is 2.3:1]

| −10° C. +10° C. | 1,000 ml. Methanol<br>80 g. Pellet NaOH (2 moles)<br>99 g. EI (2.3 moles)<br>92.5 g. Epicholorhydrin (1 mole)<br>1,000 ml. Acetone | Analysis:<br>61.4%<br>azirane<br>ring. |
|---|---|---|

*Example VIII*

[Ratio of EI to EpCH is 2:1]

| −10° C. +25° C. | 40 g. NaOH in methanol (1 mole)<br>86 g. EI (2 moles)<br>92.5 g. Epichlorhydrin (1 mole)<br>500 cc. Methanol-500 cc. Isopropyl ether. | Analysis:<br>83.0%<br>azirane<br>ring. |
|---|---|---|

*Example IX*

[Ratio of EI to EpCH is 3:1]

| 10° C. | 40 g. Pellet NaOH (1 mole)<br>500 cc. Methanol<br>171 g. 2-methyl EI (3 moles)<br>92.5 g. Epichlorohydrin (1 mole)<br>500 cc. Acetone | Analysis:<br>82.7%<br>azirane<br>ring. |
|---|---|---|

*Example X.—Reaction of 2-Ethyl EI With Glycerol 1,3 Dichlorohydrin*

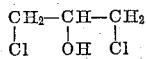

13 grams glycerol dichlorohydrin were dissolved in 100 cc. methanol. To this were added 8 grams sodium hydroxide and the whole stirred until solution was complete with cooling to 15° C. The mixture was now cooled to 10° C. and to this were added 13 grams EI. This gives a proportion of 3 moles to 1 mole glycerol dichlorohydrin. The whole was stirred until no more salt was separated. An equal volume of isopropyl ether was added and after stirring until the salt had set, the separation of salt was complete and the whole was filtered. The solution was then evaporated down under reduced pressure at not over 40° C. to give a liquid product closely resembling in appearance that of experiment in Example No. 6. Upon subjecting this to distillation under reduced pressure, a colorless oil (B.P. 60–65° C. under 1 to 2 millimeters pressure) was obtained. This was analyzed to contain 99% aziridine group according to Allen and Seamen.

One use of the polymer is as an anion-exchange resin produced in the form of an insoluble foam by using carbon dioxide for example as both catalyst and blowing agent. The following example is illustrative.

*Example XI*

The reaction product of Example I given above was subjected to a current of carbon dioxide at a temperature of 25–27° C. Insoluble solid material, apparently polymeric, and having the properties of an anion-exchange resin, was produced. This polymer may be used as an anion-exchange resin. Theoretical ion exchange value of this polymer is 130 milliequivalents per gram.

In connection with the nomenclature of the products concerned with this invention, two systems of describing these compounds may be employed. Following a widely accepted custom, these compounds have been described as aziridinyl derivatives of propanol. However, they can also be described as derivatives of carbinol (methanol).

In the first case, isopropanol is regarded as the parent compound and one hydrogen atom of each methyl group is replaced by an aziridinyl group, establishing a direct carbon nitrogen bond. In the other case, methanol or carbinol is regarded as the parent compound and two hydrogen atoms of the methyl group are replaced by an aziridinyl-methyl group like

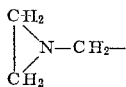

Both nomenclatures have been used in the specification, but the latter one employing carbinol as the parent compound is preferred and has, therefore, been selected in the description of the physical properties.

The following physical data was obtained on stated compounds purified by distillation under reduced pressure.

BIS (AZIRIDINO-METHYL) CARBINOL

| | |
|---|---|
| Azirane assay | 102.27%. |
| Viscosity (25°) | 20.66 centistokes. |
| S. G. (25°) | 1.0230. |
| Boiling point mm. Hg | 84°/3 mm. Hg. |
| Freezing point | −5.0 to −10° C. |
| Melting point | 25.6° to 25.8 C. |
| Molecular weight | Molecular weight determinations by the Rast method indicate, within experimental error, that this compound is in the monomeric form. |

This compound is a clear, colorless liquid which is soluble in water, in lower molecular weight alcohols, in aromatic hydrocarbons, in ketones, and in other common organic compounds. On cooling, it crystallizes in needles.

BIS (3-METHYL AZIRIDINO-METHYL) CARBINOL

| | |
|---|---|
| Azirane assay | 97.80%. |
| Viscosity (25°) | 19.02 centistokes. |
| Boiling point mm. Hg | 71–72°/1 mm. Hg. |
| Freezing point | Does not freeze above −80° C. Forms glass. |
| Molecular weight | Molecular weight determinations by the Rast method indicate, within experimental error, that this compound is in the monomeric form. |

This compound is a clear, colorless liquid which is soluble in water, in methanol, and in the common organic compounds.

BIS (2 ETHYL AZIRIDINO-METHYL) CARBINOL

| | |
|---|---|
| Azirane assay | 111.0%. |
| Viscosity (25°) | 33.15 centistokes. |
| Boiling point mm. Hg | 61–63° at an indefinite reduced pressure. |
| Freezing point | Does not freeze above −80° C. Forms glass. |
| Molecular weight | Molecular weight determinations by the Rast method indicate, within experimental error, that this compound is in the monomeric form. |

This compound is a clear, colorless liquid which is insoluble in water; generally soluble in methanol, in lower molecular weight alcohols, in aromatic hydrocarbons, in ketones, and in other common organic-type compounds.

Products of the present invention may be utilized for a variety of purposes: They may be advantageously substituted for tris-aziridinyl phosphine oxide in its well-known uses; for example, in the flame-proofing of textiles in conjunction with tetrakis hydroxymethyl phosphonium chloride. This is described by Reeves et al. (Textile Research Journal, March 1957, pp. 260–6). In Reeves' process, the cotton or other cellulosic fabric is impregnated by padding with an aqueous solution containing both tetrakis hydroxymethyl phosphonium chloride and tris-aziridinyl phosphine oxide, dried and cured at about 140° C. Treatment with the aziridinyl phosphine oxide itself with a suitable catalyst gives a crease-resistant fabric. (Drake and Guthrie, Textile Research Journal, February 1959). Our new bis-aziridinyl compounds may be substituted for tris-aziridinyl phosphine oxide in both applications. (See also U.S. Pat. 2,809,941, which claims the first of the above processes.)

They may be used in textile printing, as for example in the process described by Karl Craemer (U.S. Pat. 2,813,083), in which a wash resistant print is achieved by dispersing a pigment in an emulsion comprising a water-insoluble high polymer substance (such as an acrylic ester polymer), dispersed in a solution of a water-soluble protective colloid which contains active hydrogen atoms (such as gum tragacanth), and a monomeric cross-linking agent, one example of which is given as diethylene oxamide.

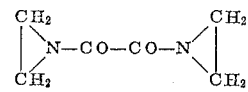

Wool may be rendered resistant to moths by reducing the cystine linkage of the wool (for example, by thioglycollic acid) and then connecting the so-formed thiol groups by reaction with our bis-aziridinyl propanol. An analogous process is described by Geiger, Patterson, Mizell and Harris (J. Research Natl. Bur. Standards, 27:459) (1941), who, following the treatment with thioglycollic acid, used ethylene dibromide to form a stable connecting link between the SH groups resulting from the reduction step. A bis-aziridinyl compound is inherently more reactive than the dihalide.

Replacement of tris-aziridinyl phosphine oxide or of the diaziridine compounds derived from isocyanates by the bis-aziridinyl propanols of the invention leads to the formation of a hydrolysis-resisting cross-link of the type

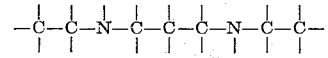

instead of the unsaturated link

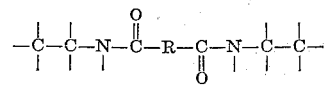

or a link containing the P—N link. In these latter two, the C—N and the P—N— links are markedly less resistant to hydrolysis, especially in acid media.

Having thus set forth my invention I claim:

1. A monomeric compound of the formula

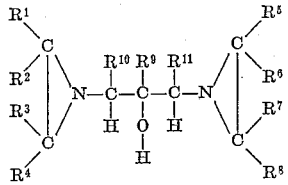

in which substituents $R^1$, $R^2$, $R^5$ and $R^6$ are selected from the group consisting of H and monovalent, saturated alkyl radicals of the general formula $C_nH_{2n+1}$, and $R^3$, $R^4$, $R^7$, $R^8$, $R^9$, $R^{10}$ and $R^{11}$ are hydrogen, the aziridin radicals being identical.

2. A monomeric compound as set forth in claim 1 in which all R groups are hydrogen.

3. A homopolymer of the compound of claim 2.

4. A homopolymer of the compound of claim 1.

5. The method of producing a monomeric compound as set forth in claim 1 which comprises reacting together an ethylene imine of the formula

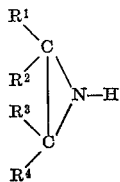

with an epichlorhydrin of the formula

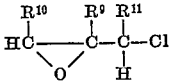

while cooling, in the presence of a dehydro-halogenating agent selected from the group consisting of alkali metal hydroxides, alkaline earth metal hydroxides, and organic amines whose basic characteristics are approximately equivalent to those of the stated inorganic hydroxides, the substituents $R^1$ to $R^4$ and $R^9$ to $R^{11}$ having the meaning set forth in claim 1.

6. The method of claim 5 in which a liquid organic solvent is present.

7. The method of claim 5 in which precipitate present is filtered off and the filtrate evaporated under reduced pressure at a temperature below that of substantial decomposition of the product produced.

8. The method of claim 5 in which the reactants are used in substantially the molar ratios of 3:1 to 1.5:1 of imine to chlorohydrin.

9. The method of producing 1,3-bis-aziridyl 2-propanol which comprises reacting together ethylene imine with epichlorohydrin at a temperature of from about −10° C. to +25° in the presence of an alkali metal hydroxide dehydro-halogenating agent.

10. The method of claim 9 in which the mole ratio of reactants is approximately from 3:1 to 1.5:1 of imine to chlorohydrin.

11. The method of claim 10 in which a liquid organic solvent is present.

12. The method of claim 11 in which the solvent is methanol.

13. The method of claim 12 in which the dehydro-halogenating agent is caustic soda.

References Cited by the Examiner

UNITED STATES PATENTS

| | | | |
|---|---|---|---|
| 1,790,042 | 1/31 | Eisleb | 260—348 |
| 2,272,489 | 2/42 | Ulrich | 260—239 |
| 2,368,082 | 1/45 | Ulrich | 260—239 |
| 2,475,068 | 7/49 | Wilson | 260—239 |
| 2,841,581 | 7/58 | Marxer | 260—239 |
| 2,868,782 | 1/59 | Gauss et al. | 260—239 |
| 2,906,716 | 9/59 | Hwa | 260—2.1 |
| 2,912,390 | 11/59 | Jaruzelski | 260—2.1 |

FOREIGN PATENTS

| | | |
|---|---|---|
| 885,942 | 6/43 | France. |
| 1,034,180 | 7/58 | Germany. |

OTHER REFERENCES

Drozdor et al.: Chem. Abs., volume 29, page 2148 (1935).

Chemical Abstracts, vol. 50, page 12351 (1956), Abstracting, Nishihara et al.

Funke et al.: Bull. Soc. Chim., France, 1953, pages 1021–3.

Benoit et al.: Bull. Soc. Chim., France, 1955, pages 946–7.

Richter: Organic Chemistry, vol. 4, pages 4 and 5, 1947.

NICHOLAS S. RIZZO, *Primary Examiner.*

DUVAL T. McCUTCHEN, WALTER A. MODANCE, *Examiners.*